United States Patent
Burry et al.

(10) Patent No.: US 9,471,889 B2
(45) Date of Patent: *Oct. 18, 2016

(54) VIDEO TRACKING BASED METHOD FOR AUTOMATIC SEQUENCING OF VEHICLES IN DRIVE-THRU APPLICATIONS

(71) Applicant: Xerox Corporation, Norwalk, CT (US)

(72) Inventors: Aaron M. Burry, Ontario, NY (US); Peter Paul, Penfield, NY (US); Edgar A. Bernal, Webster, NY (US); Orhan Bulan, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 390 days.

This patent is subject to a terminal disclaimer.

(21) Appl. No.: 14/260,915

(22) Filed: Apr. 24, 2014

(65) Prior Publication Data

US 2015/0310370 A1    Oct. 29, 2015

(51) Int. Cl.
| | |
|---|---|
| *G06T 7/00* | (2006.01) |
| *G06T 7/20* | (2006.01) |
| *H04N 5/232* | (2006.01) |
| *G06K 9/00* | (2006.01) |
| *G06Q 10/06* | (2012.01) |
| *G06K 9/62* | (2006.01) |
| *G06Q 50/12* | (2012.01) |

(52) U.S. Cl.
CPC ..... *G06Q 10/06316* (2013.01); *G06K 9/00711* (2013.01); *G06K 9/00785* (2013.01); *G06K 9/00791* (2013.01); *G06K 9/6267* (2013.01); *G06T 7/0081* (2013.01); *G06T 7/20* (2013.01); *G06Q 50/12* (2013.01)

(58) Field of Classification Search
CPC .. G06Q 10/06316; G06K 9/00; G06K 9/785; G06K 9/711; G06K 9/791; H04N 5/232; G06G 1/0175; G06T 7/00; G06T 7/20
See application file for complete search history.

(56) References Cited

U.S. PATENT DOCUMENTS

2007/0088620 A1* 4/2007 Tengler ................ G06Q 10/087 705/15

* cited by examiner

*Primary Examiner* — Sath V Perungavoor
*Assistant Examiner* — Patricia I Young
(74) *Attorney, Agent, or Firm* — Fay Sharpe LLP

(57) ABSTRACT

A method for updating an event sequence includes acquiring video data of a queue area from at least one image source; searching the frames for subjects located at least near a region of interest (ROI) of defined start points in the video data; tracking a movement of each detected subject through the queue area over a subsequent series of frames; using the tracking, determining if a location of the a tracked subject reaches a predefined merge point where multiple queues in the queue area converge into a single queue lane; in response to the tracked subject reaching the predefined merge point, computing an observed sequence of where the tracked subject places among other subjects approaching an end-event point; and, updating a sequence of end-events to match the observed sequence of subjects in the single queue lane.

18 Claims, 6 Drawing Sheets

VIDEO TRACKING BASED METHOD FOR AUTOMATIC SEQUENCING OF VEHICLES IN DRIVE-THRU APPLICATIONS

BACKGROUND

The present disclosure relates to an automated method and system for updating and correcting an event sequence when subjects randomly merge into a single queue lane after placing their respective, customized event-requests while in multiple queue lanes.

Businesses are designing throughput models to maximize efficiency and profit potentials. As an illustrative example, one industry searching for ways to increase the number of customers it serves over time includes quick serve and fast-food restaurants. Some restaurants employ side-by-side "tandem" order points to increase throughput potential. In a tandem ordering approach, multiple, separate queues in parallel are used for placing orders, but converge into a single queue lane for processing a payment and transferring the goods and/or services (at "service points").

This approach originally aimed to shorten customer wait periods for reaching the service points. A key issue with tandem ordering is that the sequence of customers that move into the single queue lane is not always the same as the sequence of when those customers placed their orders. Because the sequence in which these customers subsequently merge into the single queue lane can be random, this approach can lead to mistakes in the order-fulfillment process. Particularly, and especially during busy periods, customers may be charged the wrong amount—i.e., for the wrong order—or receive the wrong items.

However, businesses take steps to avoid mixing up orders. The current practice used to track customers' movement is to capture snapshots of each customer (vehicle) while the order is being placed. After each customer merges into the single queue lane, an employee manually re-sequences the orders in the computer system to correctly match the sequence of customers approaching the service point in the single queue lane. Furthermore, the updated sequence of orders must be relayed to the persons preparing the orders so that items can be prepared in the correct sequence, or prepared items can be reshuffled for transferring to the correct customer. These operations all result in an inefficient use of employees' time, as these employees must manage this unnecessary task in addition to their regular tasks. The multi-tasking requirement opens the door for possible mistakes, and the inefficiency can translate into lost revenue if it causes potential customers to depart from the queue, potential customers from entering the queue, or a loss in repeat business.

A system and method are desired which improve operational efficiencies regarding the processes of sequencing event-fulfillment to match a random sequence of subjects receiving the events.

BRIEF DESCRIPTION

One embodiment of the present disclosure relates to a method for updating an event sequence. The method includes acquiring video data of a queue area from at least one image source. The method includes receiving a number of individual event requests from multiple subjects. Each event request is received by a subject when the subject is located in one of multiple queues in the queue area. The method includes identifying one or more subjects in the video data which are located at least near a region of interest (ROI) of defined start points each corresponding to one of the multiple queues in the video data. The method includes tracking a movement of each detected subject through the queue area over a subsequent series of frames. Using the tracking data, the method includes determining if a location of a tracked subject reaches a predefined merge point on the image plane where the multiple queues in the queue area converge into a single queue lane. Alternatively, the merge point can instead be specified as a line, virtual trip wire, or specified region, on the image plane. In response to the tracked subject reaching the predefined merge point, the method includes computing an observed sequence of where the tracked subject places relative to other subjects already past the merge point and approaching an end-event point in the single queue lane. The method includes updating a sequence of the events to match the observed sequence of subjects in the single queue lane.

DETAILED DESCRIPTION

The present disclosure relates to an automated method and system for updating and correcting an event sequence when subjects randomly merge into a single queue lane after placing their respective event requests while in multiple queue lanes.

A "subject" as contemplated herein can include a vehicle or pedestrian, and the like, that generally waits its turn in a queue(s) to receive a customized good and/or service ("event fulfillment") after placing a custom/individual request and/or order for the event. For illustrative purposes, the subjects referred to herein include vehicles, each being associated with a customer purchasing an item. However, there is no limitation made herein to the 'subject' and the end-purpose of the queue.

A "merge point" as contemplated herein is a region defined in the camera field of view where a subject enters and/or merges into a single queue lane from one of multiple queues and is now considered to be part of the queue approaching an end-event point. For illustrative purposes, the merge point referred to herein can include a region where a vehicle enters and/or merges into a single queue lane from one of multiple queues after placing an order at one of multiple side-by-side order points, and is now considered to be part of the queue approaching the service (payment and pick-up) windows.

Figure 1:
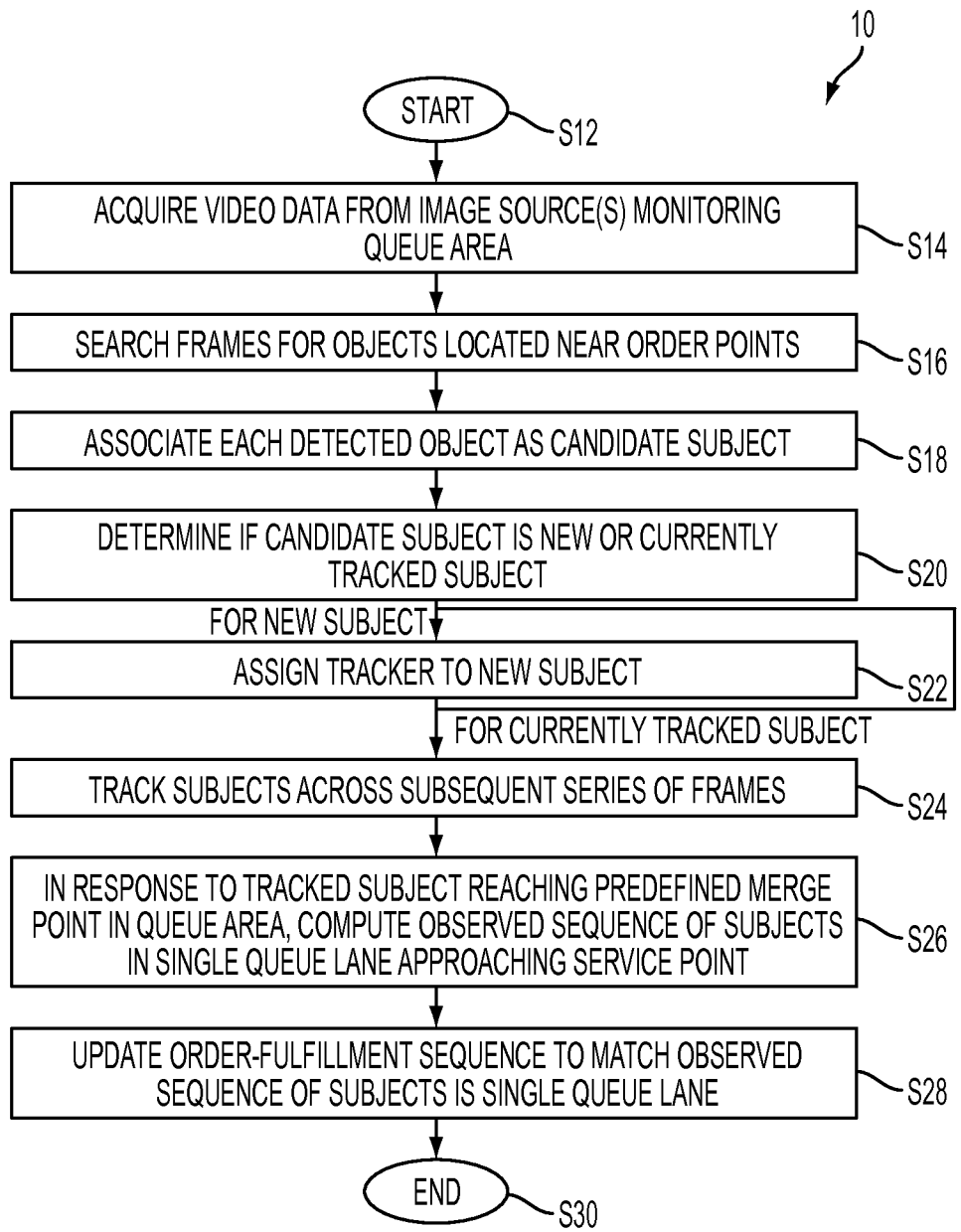
FIG. 1 is a flowchart describing an overview of a method for updating an order sequence according to the present disclosure.

FIG. 1 is a flowchart describing an overview of a method 10 for updating an order sequence according to the present disclosure. The method starts at S12. The system acquires video data from at least one image source monitoring a region of interest ("queue area") at S14. The video data is generated from at least one video camera having an individual or combined field of view that includes two or more order points in separate queues and a merge point where the separate queue lanes later merge into a single queue lane. The system searches the frames, or regions of interest (ROI) defined in the frames, for objects located at least near the order points in frames of the video data at S16. In one embodiment, the system can search the frames in response to an order being placed by a subject in one of the queue lanes. Alternatively, the system can continuously search for foreground or moving objects of interest located at least near a ROI of the order points. In this case, the system associates objects nearest the order point with an order placed at that order point. Embodiments are also contemplated where the subjects do not place orders at an order point. In these embodiments, the order points can be replaced with start points, and some trigger can initiate the searching at each start point, as long as a queue forms at each of the multiple start points and then come together at a merge point. In the discussed embodiments, existing model-based approaches for background subtraction or motion detection can be used to detect the objects. The system associates each detected object as a candidate subject at S18. In one embodiment, the system can also associate an (e.g., order) identifier with the candidate subject at the order point. Generally, the system next determines whether the candidate subject was previously assigned a tracker or is new to the scene at S20. Mainly, the approach used for making this determination includes computing a descriptor or value—such as an attribute, a distance from other subjects, a set of features, and/or a number of tracked features in the region, etc.—describing the appearance of a candidate subject and comparing the descriptor/value to thresholds or corresponding descriptors of other subjects currently being tracked. The descriptor/value that is computed is based on the type of tracking algorithm that is being applied by the system. Similarly, the tracking algorithm applied by the system can be dependent on the model-based approach used for detecting the candidate objects. Based on the results of the comparison, the system classifies each candidate subject as belonging to one of a new subject-of-interest and a currently tracked subject classes or categories. In response to the candidate subject being classified as a new subject-of-interest, the system assigns a tracker to the new subject at S22. The movement of each subject is tracked in and around the monitored queue area over the subsequent series of frames at S24. Generally, each tracked subject is followed across the series of frames until its location meets a predetermined/predefined merge point where the multiple queues converge into the single queue lane. In response to the tracked subject reaching the predefined merge point, the system computes an observed sequence of subjects approaching the service point at S26. This observed sequence corresponds to when the tracked subject transitioned into the single queue lane relative to the other tracked subjects. The system then updates the sequence of orders to match the observed sequence of subjects in the single queue lane at S28. In one embodiment, the order identifier is associated with the tracker and follows the subject across the series of frames. The system can use the order identifiers to compute the updated order sequence so that the orders can be fulfilled in the sequence that is anticipated for each subject to reach the service point. The method ends at S30.

Figure 2:
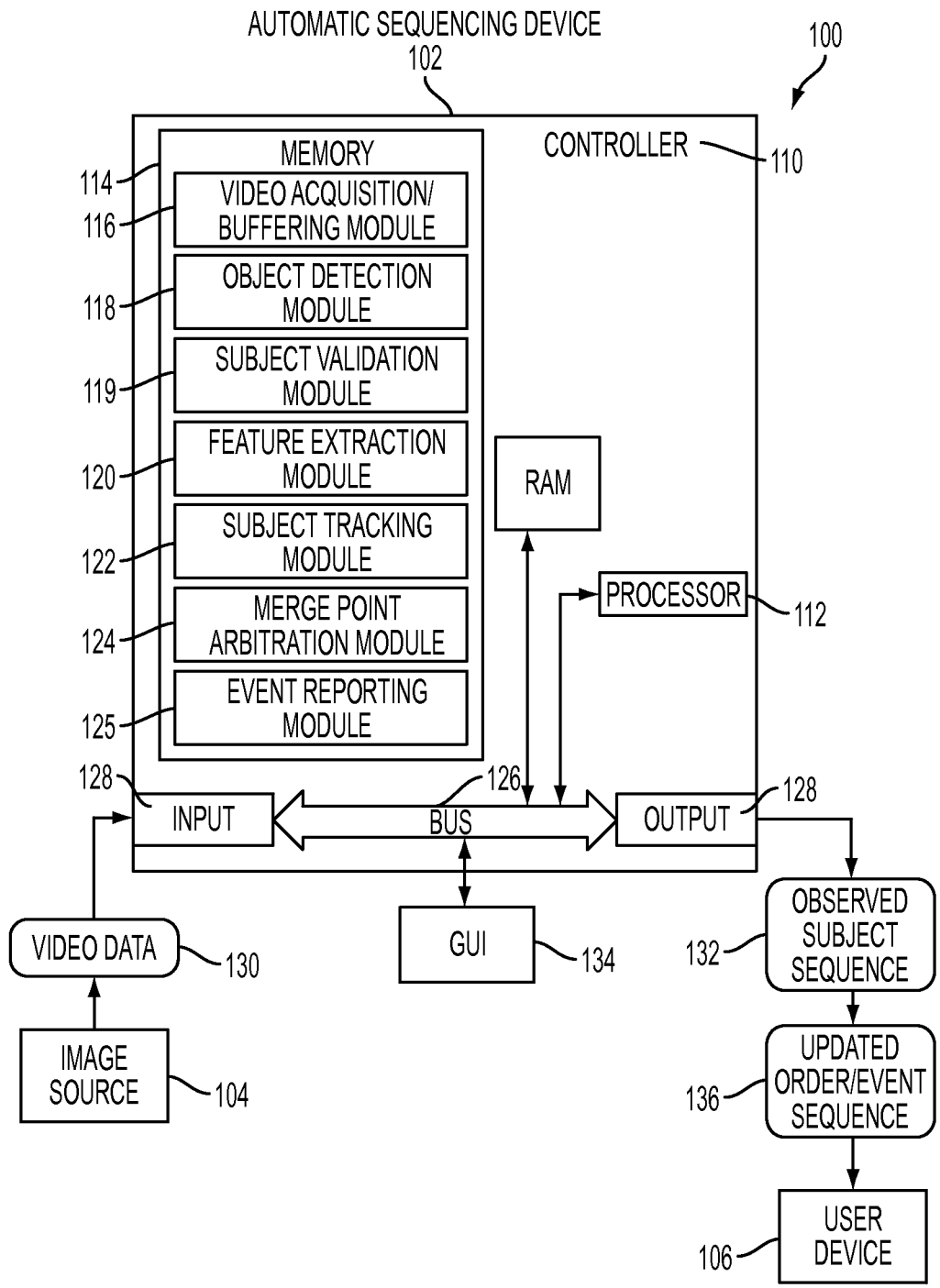
FIG. 2 is a schematic illustration of a vision-based system for automatically generating an order sequence matching a sequence in which multiple subjects transition into a merged queue lane.

FIG. 2 is a schematic illustration of a vision-based system 100 for automatically generating an order sequence matching a sequence in which multiple subjects transition into a merged queue lane. The system 100 includes an automatic sequencing device 102 and an image source 104 linked together by communication links, referred to herein as a network. In one embodiment, the system 100 may be in further communication with a user device 106. These components are described in greater detail below.

The automatic sequencing device 102 illustrated in FIG. 2 includes a controller 110 that is part of or associated with the device 102. The exemplary controller 110 is adapted for controlling an analysis of image frames or video data (hereinafter "video data") received by the system 100. The controller 110 includes a processor 112, which controls the overall operation of the device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the device 102, executes instructions stored in memory 114 for performing the parts of the method outlined in FIGS. 1 and 3. In some embodiments, the processor 112 and memory 114 may be combined in a single chip.

The device 102 may be embodied in a networked device, such as the image source 104, although it is also contemplated that the device 102 may be located elsewhere on a network to which the system 100 is connected, such as on a central server, a networked computer, or the like, or distributed throughout the network or otherwise accessible thereto. In other words, the processing can be performed within the image source 104 on site or in a central processing offline or server computer after transferring the video data through a network. In one embodiment, the image source 104 can be a device adapted to relay and/or transmit the video data 130 to the device 102. In another embodiment, the video data 130 may be input from any suitable source, such as a workstation, a database, a memory storage device, such as a disk, or the like. The image source 104 is in communication with the controller 110 containing the processor 112 and memories 114.

The stages disclosed herein are performed by the processor 112 according to the instructions contained in the memory 114. In particular, the memory 114 stores a video buffering module 116, which acquires video data from a video of the queue area; an object detection module 118, which detects candidate subjects in multiple queues included in a queue area; a feature extraction module 120, which extracts features for each new subject, a subject tracking module 122, which tracks the location of each detected subject in and around the monitored queue area until the tracked subject reaches a predetermined/predefined merge point; a merge point arbitration module 124, which computes an observed sequence of subjects approaching the service point in response to the tracked subject reaching the predefined merge point, the system; and, an event reporting module 125, which updates the sequence of orders-for-fulfillment to match the observed sequence of subjects in the single queue lane. Further contemplated embodiments can also include a subject validation module 119, which determines if each candidate subject is a new subject or a currently tracked subject. Embodiments are contemplated wherein these instructions can be stored in a single module or as multiple modules embodied in different devices. The modules 116-125 will be later described with reference to the exemplary method.

The software modules as used herein, are intended to encompass any collection or set of instructions executable by the device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the device 102 may be all connected by a bus 126.

With continued reference to FIG. 2, the device 102 also includes one or more communication interfaces 128, such as network interfaces, for communicating with external devices. The communication interfaces 128 may include, for example, a modem, a router, a cable, and and/or Ethernet port, etc. The communication interfaces 128 are adapted to receive the video data 130 as input.

The device 102 may include one or more special purpose or general purpose computing devices, such as a server computer, controller, or any other computing device capable of executing instructions for performing the exemplary method.

FIG. 2 further illustrates the device 102 connected to the image source 104 for acquiring and/or providing the video data in electronic format. The source 104 (hereinafter "video camera 104") may include one or more surveillance cameras that capture video from the scene (queue area) of interest. The number of cameras may vary depending on an extension and location of the queue area being monitored. Multiple cameras may be required where the length of a queue easily extends beyond a single camera field of view. It is contemplated that the combined field of view of multiple cameras typically comprehends the entire area surrounding the order/start points to the merge point. For performing the method at night in areas without external sources of illumination or with irregular illumination from ambient sources, the video camera 104 can include near infrared (NIR) capabilities. Furthermore, the video camera 104 used in the present disclosure is operative to capture video at a frame rate that is able (sufficiently high enough) to handle one or more subjects moving through the scene at anticipated speeds.

With continued reference to FIG. 2, the video data 130 undergoes processing by the device 102 to output the observed subject sequence 132 and/or the updated order sequence 136.

Furthermore, the system 100 can display the output in a suitable form on a graphic user interface (GUI) 134. The GUI 134 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 112. Alternatively, the device 102 can provide the output to a user device 106, which can display the output to a user, such as the users taking payment and/or fulfilling the orders. Furthermore, in one contemplated embodiment, the observed subject sequence 132 and/or the updated order sequence 136 can be transmitted to another computer application, which can perform additional processing on the data for redesigning throughput models to maximize efficiency and profit potentials.

Figure 3A:
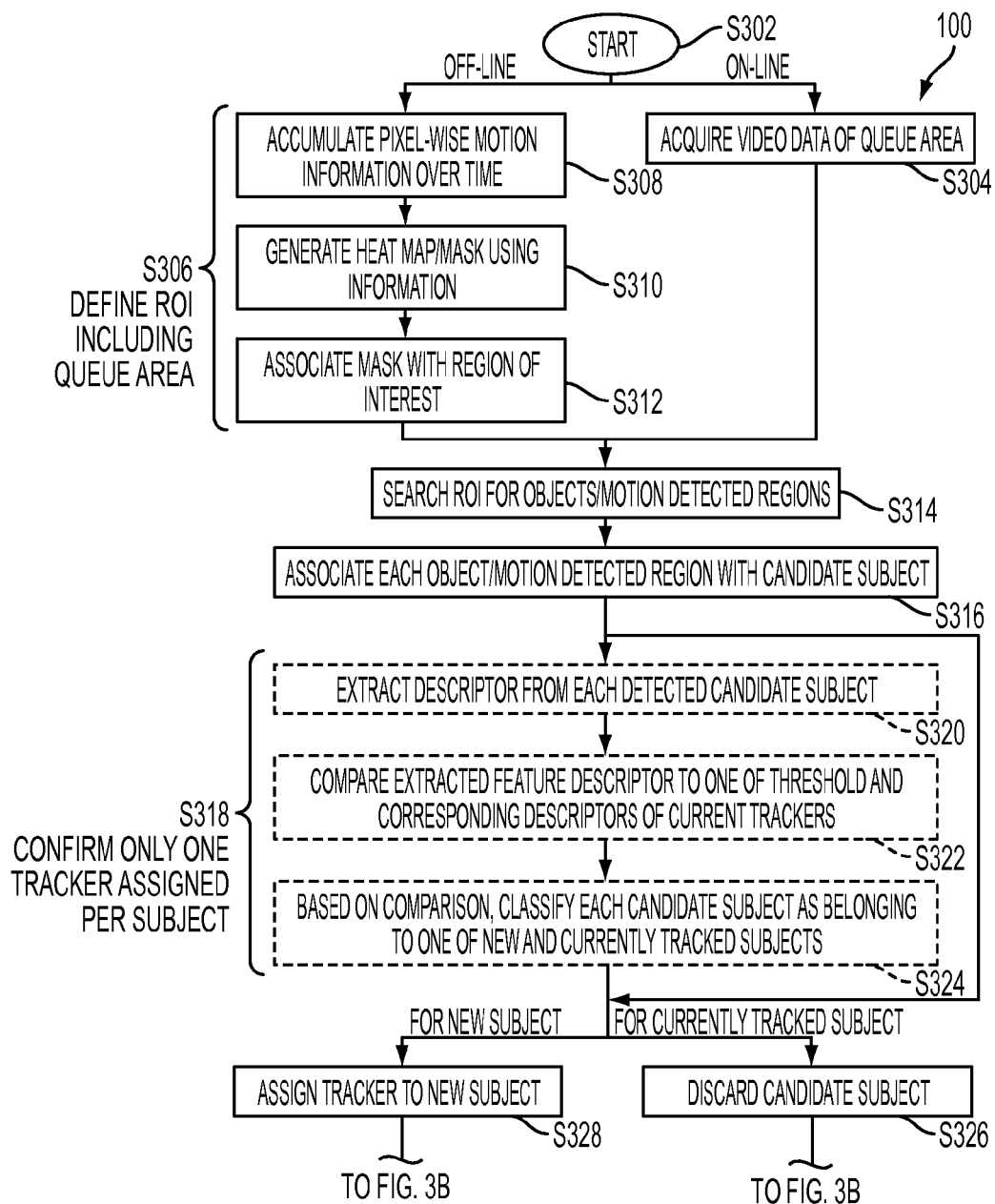
FIG. 3A-B is a detailed flowchart describing a method for automatically generating an event sequence matching a sequence in which multiple subjects merge from multiple queues into a single queue.
Figure 3B:
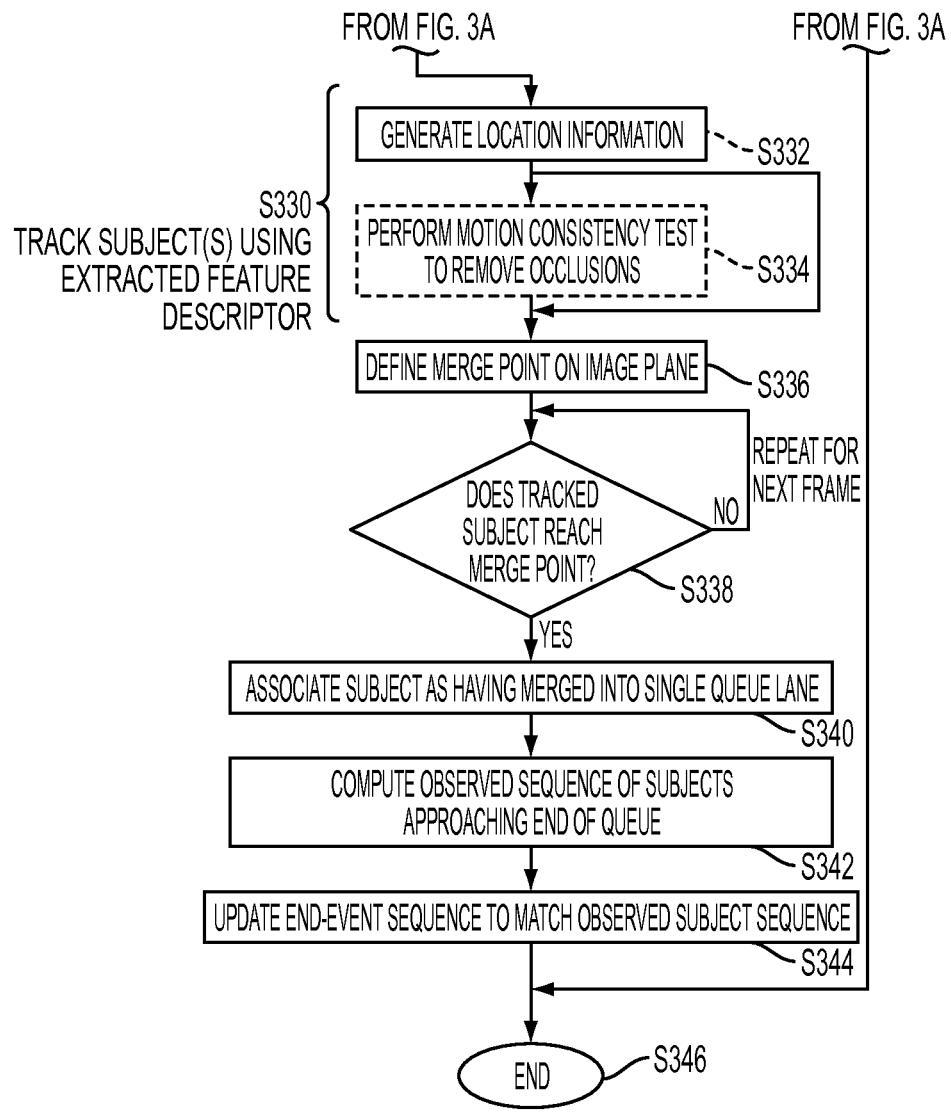
Figure 4:
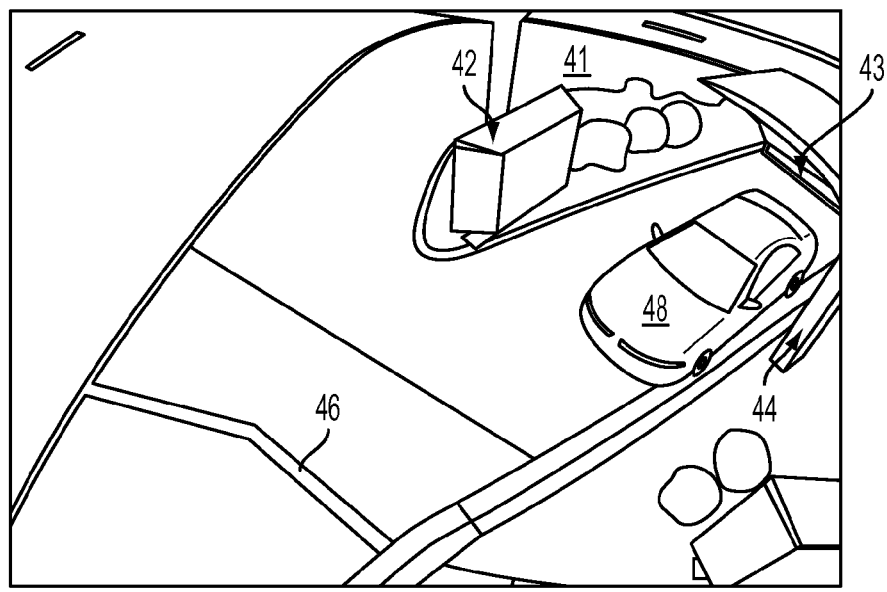
FIG. 4 shows a sample image frame including a queue area in a camera field of view.

FIG. 3A-B is a detailed flowchart describing a method 300 for automatically generating an event sequence matching a sequence in which multiple subjects merge from multiple queues into a single queue. The method starts at S302. The system acquires video data from at least one image source monitoring a region of interest ("queue area") at S304. The video data is generated from at least one or more video cameras having an individual or combined field of view that includes two or more start points in separate queues and a merge point where the separate queue lanes later merge into a single queue lane. An example image frame is illustrated in FIG. 4, where the present method can be implemented in a fast-food drive-thru. In this illustrated example, the start points include side-by-side order entry points 42, 44 that correspond to the locations of menus where orders are placed using microphones. The merge point 46 is marked as a line in the image space, commonly called a "virtual tripwire") (see 46 in FIG. 4). The video camera(s) includes an individual or combined field of view wide enough to capture a subject's (vehicle 48 in FIG. 4) movement at least from the start point to the merge point. The camera(s) field of view(s) can cover additional regions of the queue area including the entry portions 41, 43 of the separate queues located before the start points—i.e., where subjects enter either one of the separate queues—and the end portion of the single queue located after the merge point, such as at the service point.

The video data can be acquired directly from the video camera(s) or from an intermediate image source that stores and/or relays the video data from the video camera. Regardless, a placement of the video camera can be fixed close to the start and merge points to avoid and/or minimize occlusions observed in the scene. In one embodiment, the video camera can be mounted above the queue area to capture a general top-view of the start and merge points, particularly to avoid subjects moving in a first queue (located closer to the video camera) from obstructing subjects moving in a second (located farther from the video camera). However, the disclosure contemplates that the video buffering module 116 can support geometries for video data acquired from video cameras placed elsewhere. In other words, the system disclosed herein can process video data acquired from cameras included in existing surveillance infrastructure.

Returning to FIG. 3A, the video buffering module 116 transmits the video frames acquired from the video data to the subject detection module 118 for processing. The module 118 can process each frame, or every n-th frame, in the sequence. Similarly, the module 118 can process the entire image frame or a region of interest (ROI) defined in the frames. More particularly, the ROI can include a ROI of the image frame where new objects are anticipated to appear in the queue area, such as at the start point or the queue portions located right before the start points. One aspect of processing designated ROIs is that it prevents a detection of subjects ("false detections") appearing and/or moving beyond the queue area. By defining ROIs in the image frames, the system can limit the computational burden of the subject detection phase (given a real-time requirement to keep up with traffic flow) and can reduce the number of false detections.

Therefore, a ROI including the queue area can be defined in one contemplated embodiment at S306. The ROI can be defined manually by a user when the video camera is set up and calibrated. This ROI can be defined once since the queue area does not change as long as the video camera remains fixed. As the camera settings change (e.g., because of zoom, pan, tilt or translation), the defined area can be updated during a recalibration procedure.

In another embodiment, the ROI(s) can be identified in an offline learning phase. Because a majority of traffic occurs in the queue area situated between the start points and the merge point, the system can identify the queue area by searching for motion (for example, using frame differencing or a model-based approach) in the entire scene over time. Particularly, the module 120 can accumulate pixel-wise motion information at each pixel location over time at S308 and generate a heat map (representing the trajectory of subjects' movement) using this information.

Figure 5:
FIG. 5 shows a sample mask generated for the image frame shown in FIG. 4.

The module 120 can furthermore eliminate objects detected outside the queue area-of-interest ("outliers") by performing a thresholding operation on the heat map. Particularly, the module 120 can generate a mask representing the heat map at S310, and then discard any objects that are subsequently detected outside the highlighted region. FIG. 5 shows a sample mask generated for the image frame shown in FIG. 4. The module 118 then associates the mask with the ROI (queue area-of-interest) at S312.

This learning approach can be used to remove large amounts of extraneous background noise or "phantom" objects. Alternate embodiments can apply a distance from a center of these learned routes to determine the likelihood a potential new object-of-interest will be detected.

Returning to FIG. 3A, the subject detection module 118 searches the defined ROI(s) (or entire frames) for moving foreground objects at S314. Foreground object detection in video can be achieved via a number of different methods. Two common methods of motion detection used in applications that perform analytics on video data include frame-to-frame differencing and background estimation and subtraction ("background subtraction"). The frame differencing approach detects moving objects within the camera field of view by computing pixel-wise differences between successive frames in the video stream, typically requiring tuning to a very narrow range of object speed relative to the frame rate and camera geometry. By thresholding these differences, areas containing moving objects ("motion detected regions") can be easily identified.

Alternatively, model-based approaches for motion/foreground detection can be used. In one embodiment, the system 100 performs the background subtraction approach. The background subtraction approach detects foreground objects rather than moving objects. However, moving objects also trigger foreground detection because their appearance differs from the background estimate. For example, when an image of the background, without any foreground objects, is available, a model is trained to estimate common pixel values. Mainly, background subtraction computes the absolute intensity/color difference between the known or estimated background model and each current frame in the video sequence. By comparing each current frame to the background model, the pixels of which the computed distance in the intensity/color space does not meet a predetermined threshold value are classified as background pixels and the pixels of which the computed distance in the intensity/color space meets and exceeds the threshold (i.e., do not fit the existing background model) are classified as foreground pixels. The detected foreground pixels indicate a foreground object/motion detected region.

Strategies used to maintain a background model or estimate include a historical statistical model (e.g., a parametric descriptor density model, such as, Gaussian Mixture Models (GMM) based approach or a non-parametric descriptor density model, such as, a kernel-based estimate) for each pixel is constructed, eigenbackgrounds (which use principal component analysis), computation of running averages (that gradually update the background after each next frame), and median filtering, etc. The background models are typically adjusted dynamically to account for slow variations in the background of the scene. In the contemplated embodiment, the background estimate can be continuously updated with each incoming frame at a rate controlled by a predetermined learning rate factor. However, embodiments are contemplated where the background estimate can be updated at slower rates. Other alternatives are also contemplated for constructing the current background model.

A binary mask/difference image (i.e., a foreground object mask) is generated using the pixel classifications. In one embodiment, a morphological operation that is understood in the art can be applied to the difference image to filter out sources of fictitious motion and to accurately detect pixels associated with foreground or moving objects. An example filtering technique can include applying dilation and closing operations to fill in holes in the binary mask and to bridge small gaps in regions where an object has been erroneously split into a number of smaller, separate foreground elements. Connected component analysis (CCA) can also be used to eliminate small, extraneous regions where motion is detected in the binary mask. These motion detected regions can result from foreground objects that are too small to be of interest (e.g., a bird flying through the scene) or from general image noise. Common features used in the CCA screening are object area, angle of orientation, and fill density.

At S316, the module 118 associates each detected object/motion detected region with a candidate subject-of-interest. Because the module 118 may detect foreground pixels corresponding to the same object/motion region in multiple frames, the subject validation module 119 can confirm that only one tracker is assigned per candidate subject at S318. To avoid "multiple sightings" of the same subject from being treated as multiple candidate subjects, the subject validation module 119 ensures that only one tracker is assigned to each detected subject. By managing the tracker assignments, the module 119 essentially prevents multiple trackers from being assigned to the same subject detected over multiple frames. One aspect of this validation procedure is that it can reduce the computational load needed in the tracking stage. Another aspect of this validation procedure is that it can reduce the number of erroneous event sequence detections.

The module 119 extracts a descriptor for each candidate subject at S320. Because the system applies one tracking algorithm in the contemplated embodiment, the descriptor corresponds with the selected tracking approach.

Example tracking algorithms contemplated herein include region-based tracking algorithms and point trackers. Examples of region-based tracking algorithms can include mean shift and particle filtering. Example descriptors that can be extracted for the region-based tracking algorithms include attributes—such as color histograms and/or histograms of oriented gradients, etc.—and the distance of the detected motion region to each currently tracked subject. Mainly, these tracking algorithms consider the entire subject as a region. An example of a point tracker can includes KLT tracking. Example descriptors that can be extracted for point trackers includes a set of features from the motion detected region or a number of currently tracked features in the motion detected region. Mainly, point trackers consider sets of localized entries, such as hard edges, corners, and interest points of the candidate subject (foreground object).

The module 119 compares each descriptor to one of a predetermined threshold and currently tracked descriptor at S322. Based on the comparison, the module 119 classifies each candidate subject as belonging to one of a new subject and a currently tracked subject at S324.

For region-based tracking algorithms, if the extracted descriptor is an attribute of the candidate subject, the attribute is compared with the attributes of currently tracked subjects. In response to the attributes of the motion detected region not matching the attributes of any currently tracked subject, the module 119 classifies the candidate subject as belonging to a new subject. In response to the attributes of the motion detected region matching the attributes of a currently tracked subject, the module 119 classifies the candidate subject as belonging to a currently tracked subject.

If the extracted descriptor is the computed distance between the motion detected region and each currently tracked subject on the image plane, the computed distance is compared to a predetermined distance threshold. In response to the computed distance meeting and exceeding the predetermined threshold, the module 119 classifies the candidate subject as belonging to a new subject. In response to the computed distance not meeting the predetermined threshold, the module 119 classifies the candidate subject as belonging to a currently tracked subject.

For point trackers, if the extracted descriptor is a set of features from the motion detected region, the set of features is compared to the sets of features of currently tracked subjects. The number of matching features is counted. In response to the number of features not meeting a predetermined threshold number, the module 119 classifies the candidate subject as belonging to a new subject. In response to the number of features meeting and exceeding the predetermined threshold number, the module 119 classifies the candidate subject as belonging to a currently tracked subject.

Similarly, if the extracted descriptor includes a number of currently tracked features in the motion detected region, this number is compared to a predetermined threshold. In response to the number of currently tracked features not meeting a predetermined threshold number, the module 119 classifies the candidate subject as belonging to a new subject. In response to the number of currently tracked features meeting and exceeding the predetermined threshold number, the module 119 classifies the candidate subject as belonging to a currently tracked subject. The logic behind this approach is when vehicle being tracked is moving, the motion detected blob will overlap with the tracked vehicle and will contain a set of features already being tracked.

One embodiment is contemplated however which performs the validation independent of the tracking mode. For example, once the subject detection module 118 detects a candidate subject, the module 119 can determine whether that the detected candidate subject overlaps a predetermined percentage of the detected candidate subject in a next frame. In response to the overlap meeting and exceeding the predetermined percentage, the module 119 can determine the number of consecutive frames that the overlap threshold is met. In response to the number of consecutive frames meeting and exceeding a predetermined threshold number, the module 119 classifies the candidate subject as belonging to a new subject. In response to the number of consecutive frames not meeting the predetermined threshold number, the module 119 classifies the candidate subject as belonging to a currently tracked subject. In one embodiment, the threshold number can be five (5) consecutive image frames.

In response to the candidate subject being classified as belonging to a currently tracked subject, the module 119 discards the subject at S326. However, a feature extraction module 120 assigns a tracker to each new subject at S328. More specifically, the module 120 assigns the descriptor (attributes or features) extracted at S320 to the tracker. However, for embodiments that omit the validation procedure (S318-S324), a descriptor is extracted for each new subject. As mentioned supra, the descriptor can be based on the tracking algorithm later applied by the system. For example, if a point tracker such as KLT is applied, then the extracted features can be selected from a group consisting: Harris corners, scale-invariant feature transform (SIFT) features, and speeded-up robust features (SURF). Likewise, if a region-based tracker such as mean-shift is to be used, then the extracted features can include color attributes of the object region, such as a color histogram.

The features can be extracted from either color or grayscale images. In embodiments where NIR illumination is used, the module 120 can extract Harris corner features or gray-level histograms from grayscale images.

Alternatively, in one embodiment, a template of the detected motion region (i.e., a cropped sub-image of the new subject-of-interest) can be used as a set of features.

The extracted descriptor (hereafter "features") is transmitted to the vehicle tracking module 122, which tracks the extracted features across subsequent frames in the video stream at S330. The tracking algorithm used by the module 122 processes features that are consistent with the ones extracted by the previous modules 119, 120. As mentioned supra, the module 122 can apply one of a number of different tracking approaches including, but not limited to mean-shift tracking, contour tacking, Kalman filtering, KLT tracking, and particle filtering, etc. Generally, the module 120 determines the location of each tracked subject across subsequent frames at using the trackers. The module 120 anticipates that the subjects move with the queue in the scene, and the locations therefore change over time. For each frame that a subject remains within the camera (or combined cameras) field of view, the module 120 generates tracking data describing the location of the subject in pixel coordinates at S332.

Figure 6:
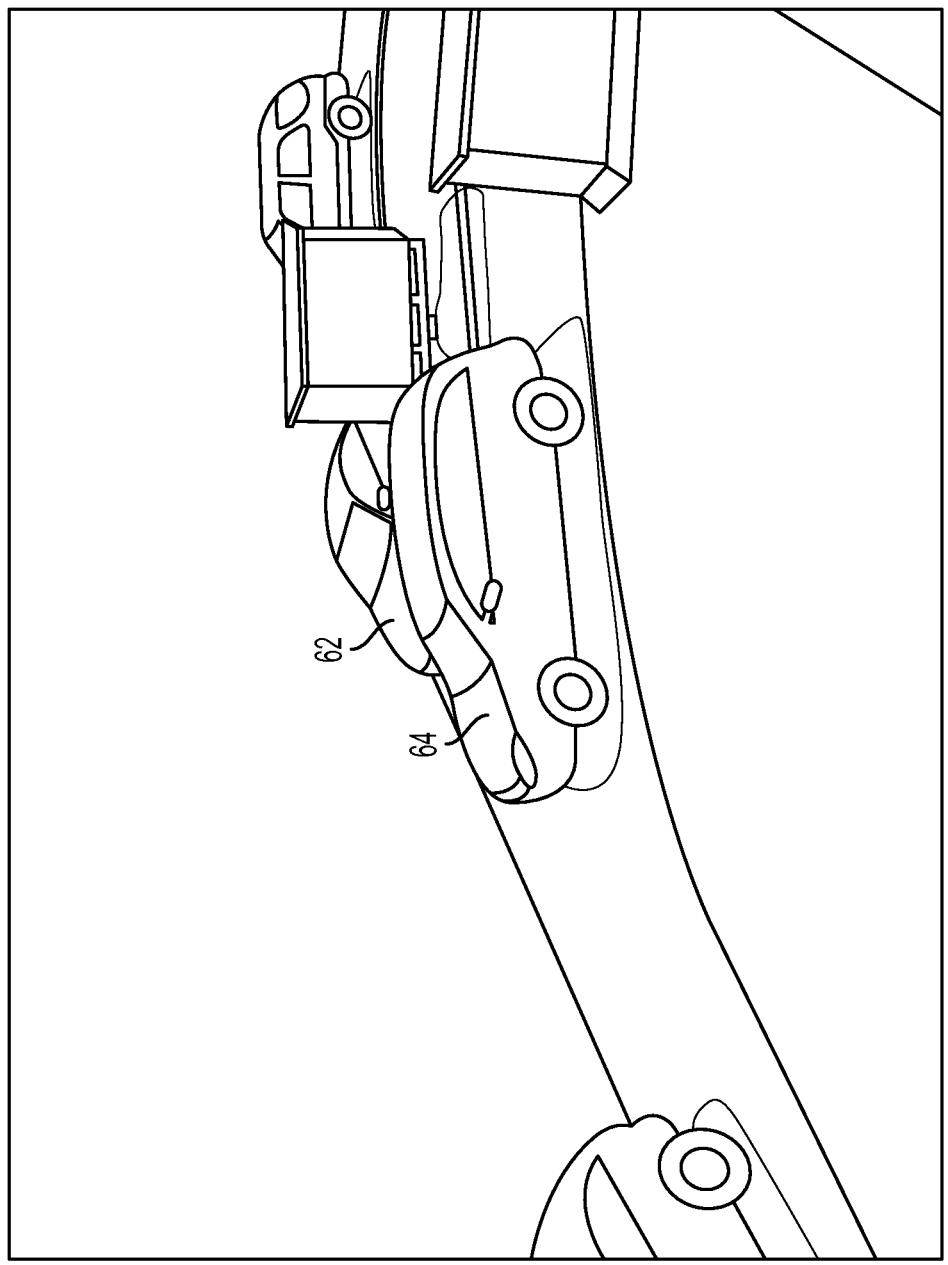
FIG. 6 shows a sample image frame including a queue area in a camera field of view, where subjects located farther from the camera are partially occluded by subjects located closer to the camera while traversing the scene.

In one embodiment, the module 120 can perform a motion consistency test at S334 to verify that the movement of the tracked features is consistent with that of a rigid object. For example, FIG. 6 shows a sample image frame including a queue area in a camera field of view, where a first subject-vehicle 62 located farther from the camera is partially occluded by a second subject-vehicle 64 located closer to the camera when traversing the scene. By monitoring the overall motion/movement of the set of features for a given subject, features which are not moving jointly with the set—i.e., features which were initially extracted from the motion detected region but have drifted onto other elements of the scene at some point—are identified and removed from the feature set. This test can be performed, for instance, to detect initial features that were erroneously chosen on background areas immediately surrounding the tracked subject-of-interest or to remove features corresponding to another subject or object that occludes the camera's view of the tracked subject. For example, where the initial set of features extracted for the first vehicle 62 in FIG. 6 included features from both vehicles 62, 64, the motion consistency test can remove the features from the second vehicle 64 from the feature set associated with the first vehicle 62. Particularly, this removal occurs when one of the first and second vehicles 62, 64 moves from its initial location, or as both vehicles move in slightly different directions. This type of pruning can produce a smoother, more robust tracking performance and improve the overall accuracy of the present system, particularly for queue configurations having a close-quarters layout and a large number of start-and-stop events.

For an illustrative example, in an embodiment where the tracking approach used by the system includes a KLT point tracker with Harris corner features, the set of tracked Harris corner feature points can be adjusted dynamically (pruned) to account for features which are not "well-behaved".

In one alternate tracking embodiment, a template of the detected motion region (i.e., a cropped sub-image of the new subject-of-interest) can be used as a set of features. A template matching approach is used to locate the best match for this template in a subsequent frame. The template is updated each time a new location is determined in order to deal with slowly varying illumination, pose, etc.

The subject tracking module 122 transmits the tracking data/location information to the merge point arbitration module 124. For a given frame, the merge point arbitration module 124 can define a location of the merge point region at S336. Alternatively, a virtual trip wire can be defined on the image plane. This step can be executed once since the merge point does not change as long as the camera configuration and queue configuration remain the same.

Using the location information associated with each tracked subject, the module 124 determines if the tracked subject reaches or passes the defined merge point at S338. In response to the tracked subject crossing into the merge point region of the given image frame (YES at S338), the module 124 associates the subject as being merged into the single queue at S340. At this point, the module 124 can discontinue tracking that subject in subsequent frames. In response to the tracked subject not reaching the merge region of the given image frame (NO at S338), the module 124 continues to receiving tracking data from the subject tracking module 122 for that subject, and repeats the determination at S338 for the next frame being processed.

The determination at S338 can compute and compare any statistic of the tracked feature locations to the location of the merge point. For example, in one embodiment a single point can be computed from the location information that roughly identifies the position of the tracked subject. For point trackers, such as a KLT tracker, this single point can be the centroid of the tracked feature locations. Other example statistics can include a centroid, a median center location, a first point, a predetermined percentage n the feature points, and a last point, etc. that pass into the merge point region. Alternatively, the module 124 can compute a convex hull containing the points being tracked. The module 124 can detect the merge event when a predetermined percentage of overlap between the hull and a defined merge region occurs. A similar approach can be used when kernel- or region-based trackers are applied by the system, where the overlap between the kernel of the tracker and the merge region can be measured, and a merge event is triggered when a degree of the overlap meets and exceeds a predetermined threshold.

Once the subject is classified as having merged into the single queue at S340, the module 124 computes an observed sequence of subjects approaching the service point at S342. As part of this computation, the module 124 essentially computes where the tracked subject-of-interest places in the observed sequence of subjects. The module 124 can transmit this computed observed sequence to the event reporting module 125.

Because the system tracks subjects from their respective order entry points, the event reporting module 125 can determine a correct sequence of information associated with each subject (such as "orders" in the illustrated embodiment) that matches with the observed sequence. The module 125 corrects and/or updates the end-event sequence at S344. In the illustrated example, the end-event can include the orders that need to be fulfilled at one or both of a payment and pick-up point. Particularly, the module 125 can update the end-event sequence using the identifier assigned to each subject when said subject was detected. Because the identifier followed the subject with the tracker, the module 125 can update the sequence to fulfill the event associated with each identifier in the same sequence that the subject will arrive at the end point.

The module 125 can provide this updated sequence to a user computer device 106, such as the restaurant point of sale (POS) system in the illustrated example. In summary, the module 125 translates each new merged subject into a message to the user device. In alternate embodiments, the event-reporting module 125 may also report non-merge events. These non-merge events may indicate when subjects depart from or cut into the queue. The method ends at S346.

The re-sequencing information computed by the present disclosure is amenable to like environments where a process is initiated in side-by-side queues and completed in a single-lane queue after the side-by-side queues converge, and particularly where process and its output follows the person in the queue. Non-limiting examples of businesses that can employ the present disclosure include banks (indoor and drive-thru teller lanes), grocery and retail stores (checkout lanes), airports (security check points, ticketing kiosks, boarding areas and platforms), restaurants (such as fast food counters and drive-thrus), theaters, carwashes, and the like, etc.

Although the method 300 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for updating an event sequence, the method including:
   acquiring video data of a queue area from at least one image source;
   receiving a number of individual event requests from multiple subjects, each event request being received when a subject is located in one of multiple queues in the queue area;
   searching one of frames and at least one region of interest (ROI) in the frames of the video data for a subject located near at least one defined start points, each corresponding to one of the multiple queues in the video data;
   tracking a movement of each detected subject through the queue area over a subsequent series of frames;
   using the tracking, determining if a location of a tracked subject reaches a predefined merge point on the image plane where the multiple queues in the queue area converge into a single queue lane;
   in response to the tracked subject reaching the predefined merge point, computing an observed sequence of where the tracked subject places relative to other subjects already past the merge point and approaching an end-event point in the single queue lane;
   updating a sequence of the events to match the observed sequence of subjects in the single queue lane; and
   wherein the queue area includes a fast-food drive-thru, the event-requests include orders, and the end-events include one of goods and services.

2. The method of claim 1 further comprising:
   searching the one of the frames and ROI for an object-in-motion;
   in response to detecting an object-in-motion, associating the detected object-in-motion as a candidate subject.

3. The method of claim 2 further comprising:
   classifying each candidate subject as belonging to one of a new subject and a currently tracked subject;
   in response to the candidate subject being a new subject, assigning a tracker to the new subject; and,
   in response to the candidate subject being a currently tracked subject, discarding the candidate subject.

4. The method of claim 3, wherein the classifying includes:
   extracting a feature descriptor from each detected candidate subject;
   comparing the extracted feature descriptor to one of a threshold and corresponding descriptors of current trackers; and
   based on the comparing, classifying the each detected candidate subject as belonging to one of a new subject and a currently tracked subject.

5. The method of claim 1 further comprising defining the ROI in the queue area.

6. The method of claim 1, wherein the tracking the movement of the each detected subject through the queue area includes:
   performing a motion consistency test to remove occlusions.

7. The method of claim 1, wherein the searching the one of the frames and ROI is performed using one of foreground detection via background subtraction and motion detection.

8. The method of claim 1 further comprising:
   in response to receiving an individual event request, associating an identifier to the subject detected nearest the defined start point at a time the individual event request is received; and,
   updating the sequence of events using the identifier.

9. The method of claim 1, wherein the determining if the location of the tracked subject reaches the predefined merge point includes:
   computing a statistic of tracked feature locations of the subject; and,
   comparing the statistic to a location of a merge point region;
   wherein the statistic is selected from a group consisting of: a single point identifying a position of the tracked subject, a centroid of the tracked feature locations, a median center location of the tracked feature locations, a first point, a predetermined percentage of feature points, a last point, and a degree of overlap.

10. A system for updating an event sequence, the system comprising an automatic sequencing device including a memory and a processor in communication with the processor configured to:
    acquire video data of a queue area from at least one image source;
    receive a number of individual event requests from multiple subjects, each event request being received when a subject is located in one of multiple queues in the queue area;
    search one of frames and at least one region of interest (ROI) in the frames of the video data for a subject located near one defined start point, each corresponding to one of the multiple queues in the video data;
    track a movement of each detected subject through the queue area over a subsequent series of frames;
    use the tracking, determine if a location of a tracked subject reaches a predefined merge point on the image plane where the multiple queues in the queue area converge into single queue lane;
    in response to the tracked subject reaching the predefined merge point, compute an observed sequence of where the tracked subject places relative to other subjects already past the merge point and approaching an end-event point in the single queue lane;
    update a sequence of the events to match the observed sequence of subjects in the single queue lane; and,
    wherein the queue area includes a fast-food drive-thru, the event-requests include orders, and the end-events include one of goods and services.

11. The system of claim 10, wherein the processor is further configured to:
    search the one of the frames and ROI for an object-in-motion;
    in response to detecting an object-in-motion, associate the detected object-in-motion as a candidate subject.

12. The system of claim 11, wherein the processor is further configured to:
    classify each candidate subject as belonging to one of a new subject and a currently tracked subject;
    in response to the candidate subject being a new subject, assign a tracker to the new subject; and,
    in response to the candidate subject being a currently tracked subject, discard the candidate subject.

13. The system of claim 12, wherein the processor is further configured to:
    extract a feature descriptor from each detected candidate subject;

compare the extracted feature descriptor to one of a threshold and corresponding descriptors of current trackers; and based on the comparing, classify the each detected candidate subject as belonging to one of a new subject and a currently tracked subject.

14. The system of claim 10, wherein the processor is further configured to:

define the ROI in the queue area.

15. The system of claim 10, wherein the processor is further configured to:

performing a motion consistency test on the tracking locations to remove occlusions.

16. The system of claim 10, wherein the processor is further configured to perform one of foreground detection via background subtraction and motion detection to search the one of the frames and ROI.

17. The system of claim 10, wherein the processor is further configured to:

in response to receiving an individual event request, associate an identifier to the subject detected nearest the defined start point at a time the individual event request is received; and, update the sequence of events using the identifier.

18. The system of claim 10, wherein the processor is further configured to:

compute a statistic of tracked feature locations of the subject;

compare the statistic to a location of a merge point region; and, determine if a location of the tracked subject reaches the predefined merge point based on the comparison;

wherein the statistic is selected from a group consisting of: a single point identifying a position of the tracked subject, a centroid of the tracked feature locations, a median center location of the tracked feature locations, a first point, a predetermined percentage of feature points, a last point, and a degree of overlap.

* * * * *